(12) United States Patent
Ghassemieh et al.

(10) Patent No.: US 9,994,336 B1
(45) Date of Patent: Jun. 12, 2018

(54) SYSTEM AND METHODS FOR DEPLOYING PAYLOADS

(71) Applicant: The United States of America as Represented by the Administrator of the National Aeronautics & Space Administration (NASA), Washington, DC (US)

(72) Inventors: Shakib M. Ghassemieh, Santa Clara, CA (US); Robert D. Ricks, Newark, CA (US); Charles R. Friedericks, San Jose, CA (US); Nghia Mai, San Jose, CA (US); John W. Hines, Sunnyvale, CA (US); Lee S. Brownston, Palo Alto, CA (US); Shannon S. Ross, Campbell, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 1087 days.

(21) Appl. No.: 13/573,924

(22) Filed: Mar. 14, 2013

(51) Int. Cl.
  *B64G 1/00* (2006.01)
  *B64G 1/64* (2006.01)
(52) U.S. Cl.
  CPC ............ *B64G 1/002* (2013.01); *B64G 1/641* (2013.01)
(58) Field of Classification Search
  CPC .. B64G 1/002; B64G 1/641; B64G 2001/643; G05D 1/0883
  See application file for complete search history.

(56) References Cited

U.S. PATENT DOCUMENTS

| | | | |
|---|---|---|---|
| 6,330,093 B1 * | 12/2001 | Eller | B64G 1/10 398/164 |
| 7,036,773 B2 | 5/2006 | Caldwell | |
| 8,888,050 B1 * | 11/2014 | Murphy | B64G 1/002 244/173.3 |

(Continued)

OTHER PUBLICATIONS

Harris, NPS Cubesat Launcher-Lite Sequencer, Thesis for Naval Postgraduate School, Monterey, California, Jun. 2009.

(Continued)

*Primary Examiner* — Nicholas McFall
(74) *Attorney, Agent, or Firm* — Christopher J. Menke; Robert M. Padilla; Mark P. Dvorscak

(57) ABSTRACT

Embodiments of the present invention include systems for launching primary or secondary payloads or actuating other launch vehicle or payload or instrumentation devices. The system includes an adapter assembly and at least one sequencer mounted to the adapter assembly. The sequencer includes: controller boards, each of the controller boards having a controller for controlling deployment of the payloads and data files; output ports coupled to the controller boards and configured to transmit signals from the controller boards to dispensers therethrough, deployment mechanisms containing the payloads, the adapter assembly having channels for accommodating the dispensers; and a detector coupled to the controller boards and adapted to detect an external signal and, in response to the external signal, to send an initiation signal to the controller boards. The system also includes at least one power supply coupled to the sequencer and adapted to provide an electrical power to the sequencer.

17 Claims, 5 Drawing Sheets

(56) References Cited

U.S. PATENT DOCUMENTS

2006/0192057 A1* 8/2006 Smith ................... B64G 1/002
244/173.1

OTHER PUBLICATIONS

Hicks, NPS Cubesat Launcher Program Management, Thesis for Naval Postgraduate School, Monterey, California, Sep. 2009.
Agasid, et al., Nanosatellite Launch Adapter System (NLAS), Proceeds of the 8th Responsive Space Conference, Mar. 8-11, 2010, Los Angeles, CA.

* cited by examiner

SYSTEM AND METHODS FOR DEPLOYING PAYLOADS

ORIGIN OF INVENTION

The invention described herein was made in the performance of work under NASA contracts and by employees of the United States Government and is subject to the provisions of § 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF INVENTION

A. Technical Field

The present invention relates to spacecraft launch systems, more particularly, to systems for launching payloads.

B. Description of the Prior Art

Access to space has continually been an area of concern for a number of space agencies, both in terms of numbers of launch opportunities and costs associate with space lift. Traditional launch campaigns tend to be unique and require a significant amount of nonrecurring engineering expense, sustaining a high cost structure. One conventional innovation surrounds the emergence of low-cost launch vehicles in the space lift marketplace. Relatively new entrants and existing companies are making significant inroads into the cost component associated with launch vehicle production and operation. There are other companies in earlier stages of development that also may potentially add to this equation.

For the past 5 to 6 years, the willingness and ability of major launch programs to accommodate smaller platforms as rideshares stimulated an emerging smallsat/nanosat spacecraft market, attracting high level interest from both the scientific and operational space communities. The small satellite community has greatly increased in size over the last decades, creating a need for a system that can most efficiently use the space available on launch vehicles.

The sharing of launch vehicles has some unique characteristics that need to be addressed in the hardware development. The most important consideration needs to be in protecting the primary spacecraft that the rocket (or, equivalently, launch vehicle) is being used for. This means that both for integration and during spacecraft deployment, the secondary payload systems need to be completely independent and have numerous safeties in place to ensure that no adverse circumstances are created for the primary spacecraft.

Accordingly, there is a need for improved systems for launching smallsat/nanosat spacecrafts that are able to protect the primary spacecrafts from additional risks from the ridesharing launches and providing consistent deployment of the smallsat/nanosat spacecrafts.

SUMMARY OF THE INVENTION

In embodiments, a sequencer for deploying payloads includes: controller boards, each of the controller boards having a controller for controlling deployment of the payloads and data files; a power supply coupled to the controller boards and adapted to provide electrical power to the controller boards; output ports coupled to the controller boards and configured to transmit signals from the controller boards to deployment mechanisms or actuating devices containing the payloads therethrough; and a detector coupled to the controller boards and adapted to detect an external signal and, in response to the external signal, to send an initiation signal to the plurality of controller boards.

In embodiments, a system for launching payloads includes an adapter assembly and at least one sequencer mounted to the adapter assembly. The sequencer includes: controller boards, each of the controller boards having a controller for controlling deployment of the payloads and data files; output ports coupled to the controller boards and configured to transmit signals from the controller boards to deployment mechanisms or actuating devices containing the payloads therethrough, the adapter assembly having channels for accommodating the deployment mechanisms or actuating devices; and a detector coupled to the controller boards and adapted to detect an external signal and, in response to the external signal, to send an initiation signal to the controller boards. The system also includes at least one power supply contained in the sequencers and adapted to provide electrical power to the sequencer.

In embodiments, a method of operating a sequencer for deploying one or more payloads includes: (a) detecting an operating environment to determine a mode of operation; (b) determining whether the mode is a flight mode; (c) if the determination in step (b) is positive, performing an operation to deploy the payloads without interruption, and (d) if the determination in step (b) is negative, determining whether the mode is a SEQUENCE LOADING & COMMUNICATIONS mode, (e) if the determination in step (d) is positive, allowing a user to set a deployment sequence of the payloads, and (f) if the determination in step (d) is negative, performing the operation to deploy the payloads until an interruption signal is received.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

Figure 1:
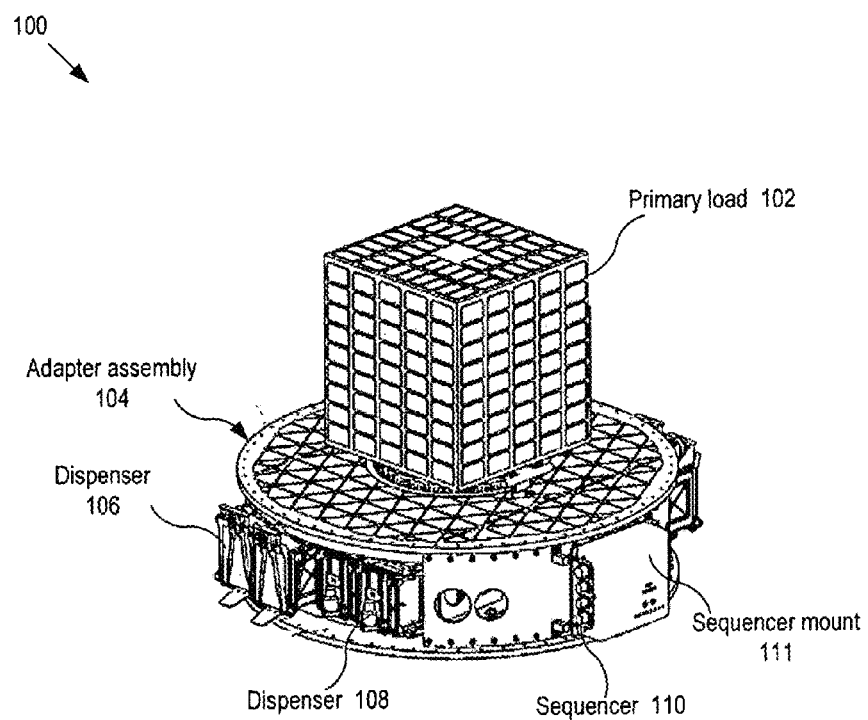
FIG. 1 shows a perspective view of payloads that might be carried by a launch vehicle according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The present invention provides a simple and inexpensive system, which is referred to as nanosat launch adaptor system (NLAS), to launch small satellites, spacecraft and other payloads using expendable launch vehicles. NLAS can be installed within the launch vehicle's primary fairing, preferably under the primary payload. NLAS allows various spacecrafts, such as smallsats, nanosats, CubeSats, microsats, and other payloads between about a few tens of kilograms and a few hundred grams, to be integrated, and independently controls deployment of the spacecrafts. NLAS may include an adapter, deployers, and a sequencer, where the sequencer can deploy payloads, instrumentations, or operate actuators or control other signals that are not necessarily carried by an integrated NLAS. NLAS allows for various interface options to the primary launch vehicle that are normally available on conventional launch vehicles. NLAS provides independent programmed deployment sequences such that the responsibility of creating multiple time varied release signals does not fall on the launch vehicle.

NLAS is unique in that it is a standalone, configurable payload launch adapter system. NLAS is an integrated system that can be adapted to the needs of a given mission. NLAS is designed to take the responsibility of producing a deployment pattern off the launch vehicle, which allows for faster mission development and easier testing. It allows customers to customize their desired launch sequence and test the sequence with hardware and then quickly incorporate the hardware into the launch vehicle.

FIG. 1 shows a perspective view of payloads that might be carried by a launch vehicle according to embodiments of the present invention. As depicted, payloads 100 include: a primary payload (or, equivalently, primary spacecraft) 102; and an adapter assembly 104 having a sequencer mounting bracket 111 for accommodating a sequencer 110 and various types of dispensers or deployment mechanisms (or, shortly, dispensers) 106 and 108 for carrying the secondary payloads. Hereinafter, the term dispensers refer to dispensers, deployment mechanisms and other actuating mechanisms that can be installed in the adapter assembly 104. The payloads 100 may be installed within the launch vehicle's primary fairing (not shown in FIG. 1). The adapter assembly 104 includes a bolt pattern to bolt to 38.81" structure (commonly seen launch interface) and adapts to 38.81" and 15.000" structures (commonly seen launch interfaces), providing a multi-interface adapter design.

Figure 2A:
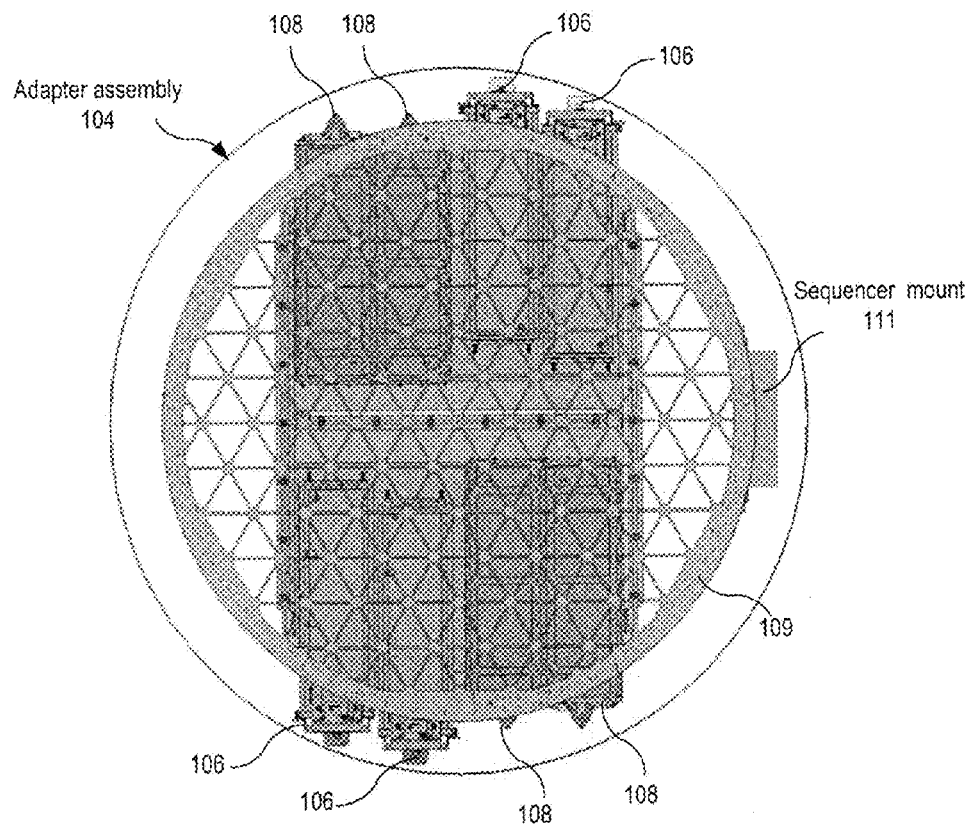
FIG. 2A shows a top view of the adapter assembly in FIG. 1.
Figure 2B:
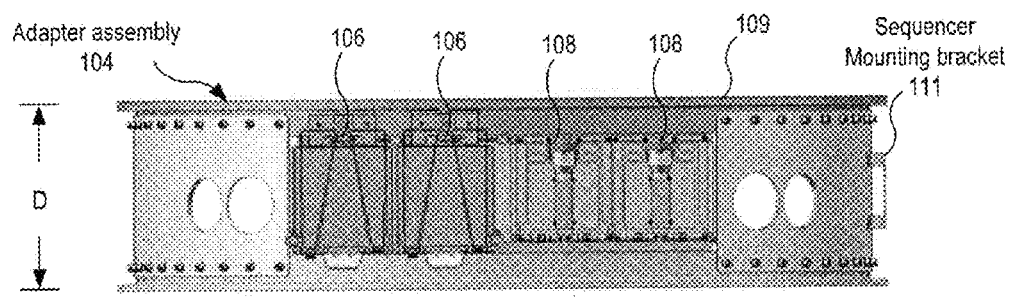
FIG. 2B shows a side view of the adapter assembly in FIG. 1.

FIGS. 2A and 2B show top and side views of the adapter assembly 104 shown in FIG. 1, respectively. For the purpose of illustration, the sequencer 110 is not shown in FIGS. 2A and 2B. As depicted, the adapter assembly 104 essentially raises the separation plane by a preset distance, D, for the primary payload 102. This distance was selected to allow the dispensers or deployment mechanisms 106 and 108 under a top deck 109, but also to limit the distance that the primary payload 102 must be raised in order to limit unacceptable dynamic load issues. The adapter assembly 104 may be compatible with various launch vehicles and designed to accommodate the primary payload 102 on the top deck 109. Also, the adapter assembly 104 has channels (or, equivalently, slots or bays) for accommodating the dispensers or deployment mechanisms 106 and 108 therein. Hereinafter, the adapter assembly 104, dispensers or deployment mechanisms 106 and 108, and sequencer 110 are collectively referred to as NLAS.

Each of the dispensers or deployment mechanisms 106 and 108 may be designed to carry a secondary payload, where the dimensions of the secondary payloads are preferably, but not limited to, multiples of 1 U, such as 3 U or 6 U. Here, 1 U, 3 U, and 6 U refer to 10 cm×10 cm×10 cm, 30 cm×10 cm×10 cm and 30 cm×20 cm×10 cm, respectively. Each dispenser may have various shapes and dimensions. For example, each dispenser may be 1 inch longer than a P-POD® launcher to accommodate a 3 U spacecraft, like O/OREOS spacecraft, with a Deorbit spacecraft mechanism. The dispensers' configuration can be interchangeable between two 3 U spacecraft or one 6 U with minimal parts changes. The dispensers 106 and 108 may be designed with as few parts as possible to reduce the manufacturing cost. In embodiments, a dispenser mounting assembly may be added to ease the integration or removal of a dispenser from the adapter assembly 104 once the adaptor assembly 104 has been installed on the rocket.

Each dispenser may provide a containerization function, which physically separates the internally housed secondary payload from the launch vehicle and primary payload 102 or other spacecraft. Each of the dispensers or deployment mechanisms 106 and 108 includes an actuator (not shown in FIGS. 2A and 2B), such as non-explosive actuator, pin puller, ordnance, Frangibolt™ actuator, and motorized actuator. When the sequencer 110 sends electrical pulses to actuators of the deployment mechanisms 106 and 108 according to a preset sequence order, the secondary payloads are deployed or released by the actuators. Depending on the type of actuator, the sequencer 110 may need to trigger the actuator with electrical power supplied by an internal power supply, such as a battery. In embodiments, externally supplied powers may be used to trigger the actuator. For instance, a different battery set near the sequence may be strapped, or power from the launch vehicle and/or some other sources may be used to trigger the actuator, allowing flexibility in changing electrical voltage and current capabilities depending on the needs. In embodiments, a compressed spring is loaded inside a dispenser and the actuator releases the door of the dispenser to thereby launch the payload by the spring force.

Figure 3:
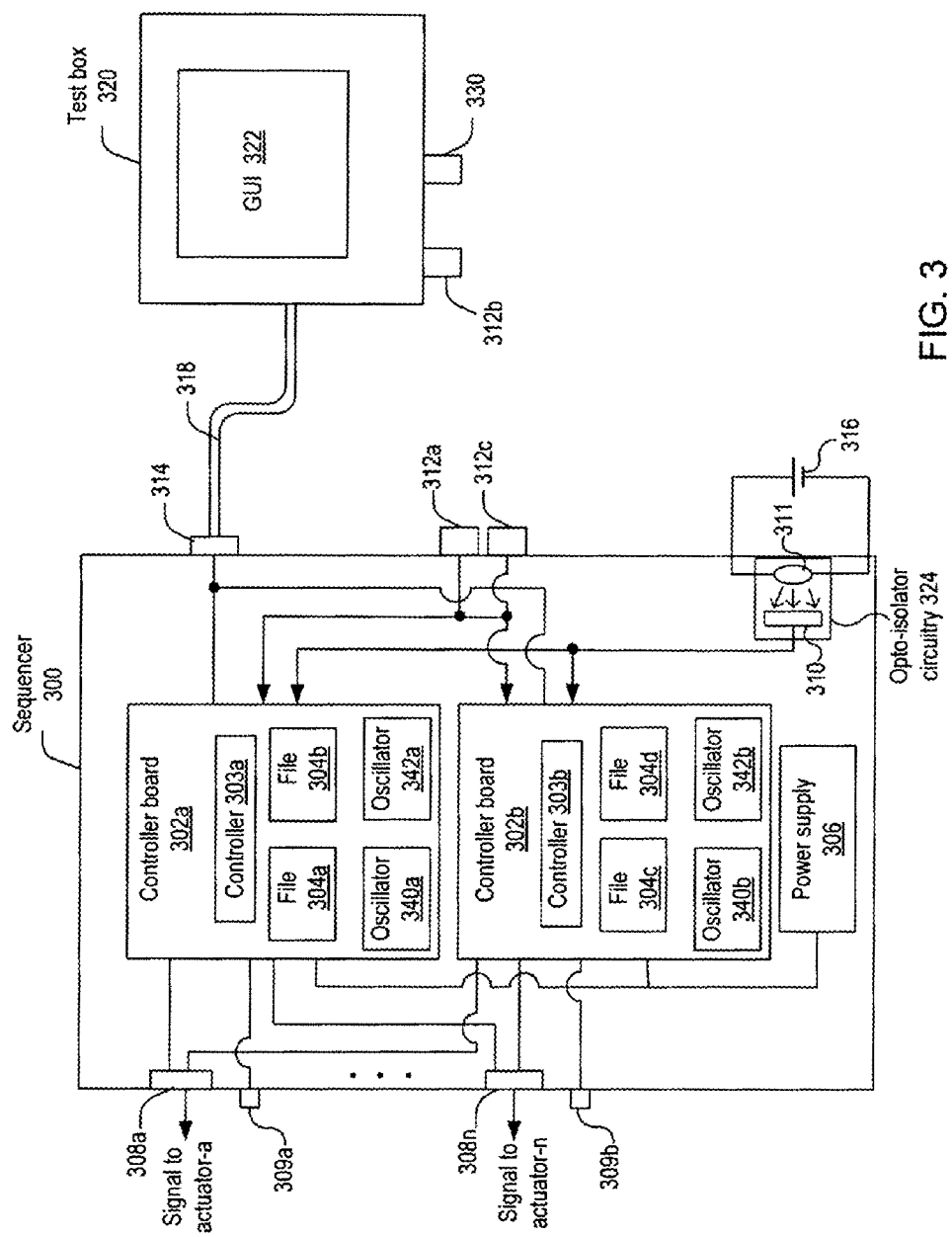
FIG. 3 shows a schematic diagram of a sequencer that might be used in the adapter assembly of FIG. 1 according to embodiments of the present invention.

FIG. 3 shows a schematic diagram of a sequencer 300 that might be mounted to the sequencer mounting bracket 111 according to embodiments of the present invention. As depicted, the sequencer 300 includes dual controller boards 302a and 302b, where the controller board 302a (or 302b) includes: a microcontroller (or, shortly controller) 303a (or 303b) for controlling deployment of the payloads, dual oscillators 340a and 342a (or, 340b and 340b), and dual files 304a and 304b (or 304c and 304d). It is noted that the sequencer 300 may include other suitable number of controller boards, and each board may include other suitable number of files.

The sequencer 300 also includes: an internal power supply 306, such as battery pack, a bank of capacitors, or a combination thereof, for providing electrical power to other components of the sequencer 300 and actuators; a communication port 314 for exchanging signals and data with a test box (or, equivalently, ground support experiment (GSE) test equipment) 320 via a cable 318; a STATUS button 312a and an INITIALIZE button 312c; output ports 308a-308n for sending actuation signals to actuators (not shown in FIG. 3); STATUS light emitting diodes (LEDs) 309a and 309b for indicating the operational status of the controllers 303a and 303b, respectively; and an opto-isolator 324. The test box 320 is connected to the sequencer 300 via the cable 318 during ground testing of the sequencer 300. The test box 320 may include a GUI 322 for allowing the test engineer to operate the sequencer 300. The cable 318 is disconnected from the sequencer 300 upon completion of the loading and testing the sequencer 300. In alternative embodiments, a Launch Vehicle Simulator button 312b may be installed on the sequencer 300. Likewise, in embodiments, the buttons 312a and 312c may be installed on the test box 320 so that the signal from the buttons 312a and 312c may be transmitted to the sequencer 300 via the cable 318.

The STATUS button 312a instructs the sequencer 300 to check the following: check for error-detection-and-correction (EDAC), check for armed status, check whether the sequencer 300 is in Flight Mode, check whether the sequencer 300 not is not in LAUNCH PREP Mode, check that launch vehicle (LV) initiation has not occurred (i.e., it is primed for the mission). Then, one or more STATUS LEDs 309a and 309b may be illuminated to provide status to the user/launch integrator.

The INITIALIZE button 312c is for "priming" the system for launch and is an optional design feature. If it is designed in, it may be used during launch integration to initialize the system. While it would need to be pressed at least once, it could be pressed more than once without issue in case the integration personnel accidentally knocks button multiple times, or isn't sure if it has already been pressed can do so again without worry.

It is noted that the sequencer 300 and the test box 320 may be formed as one integral body in embodiments. Also, in embodiments, a computer may be used in place of the test box 320. In such cases, the cable 318 may be a USB cable to power the built-in test capability. Also, in embodiments, a separate umbilical cable may be used to recharge the power supply 306 while the launch vehicle is sitting on the launch pad. It should be apparent to those of ordinary skill in the art that the arrangement and configuration of the sequencer 300 and test box 320 may be varied without deviating from the scope of the present invention.

Figure 4:
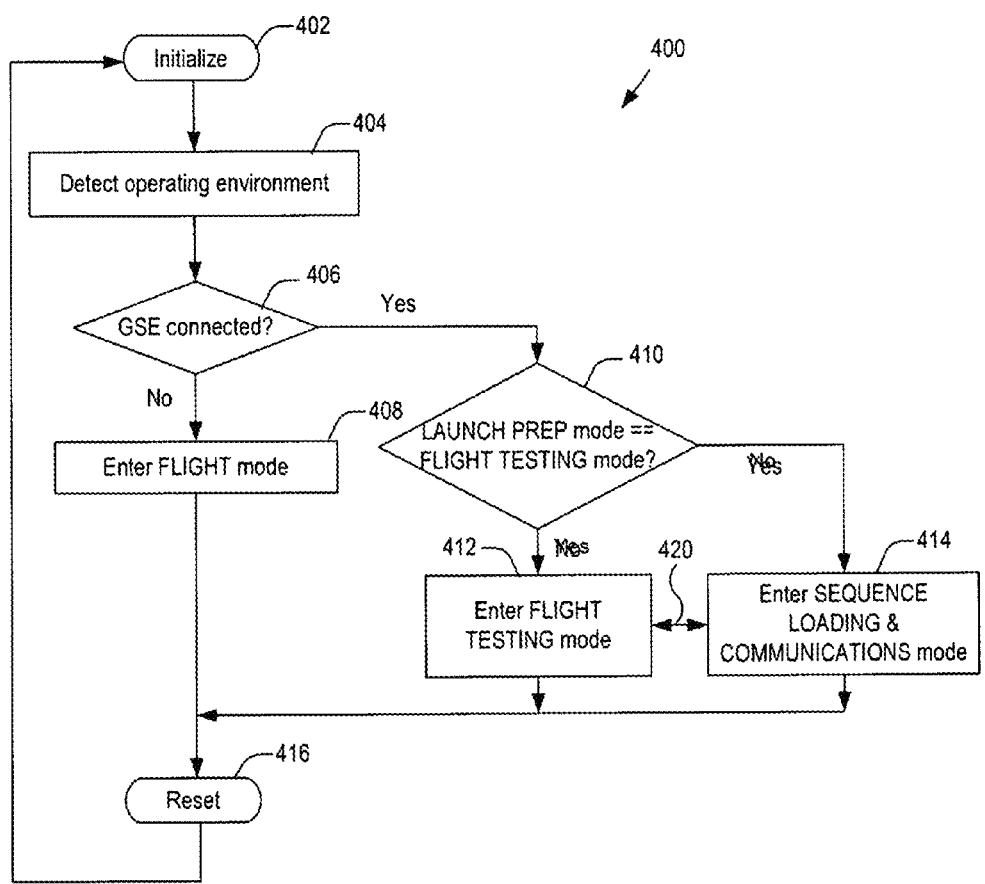
FIG. 4 shows a flowchart of an illustrative process for testing and operating a sequencer according to embodiments of the present invention.

The operation of the sequencer 300 is described in conjunction with FIG. 4. FIG. 4 shows a flowchart 400 of an illustrative process for loading, testing, and operating the sequencer 300 according to embodiments of the present invention. At the step 402, the sequencer 300 is initialized when an operator pushes the INITIALIZE button 312c on the sequencer 300. Alternatively, the operator may manipulate the GUI 322 to initialize the sequencer 300. Upon receiving the initialization signal, the controllers 303a and 303b in the controller boards 302a and 302b may configure some of the circuits on the controller boards and enter SLEEP mode, or equivalently low power mode.

The sequencer 300 is electrically isolated from the launch vehicle for the purpose of safety and powered by the power supply 306 only. The electrical power stored in the power supply 306 is used to operate the controller boards 302a and 302b and trigger the actuators, actuators of the dispensers or deployment mechanisms 106 and 108. As such, it is important to reduce electrical power consumption by the controllers so that a portion of the electrical power stored in the power supply 306 is reserved to activate the actuators when the payloads reach their target orbits. To minimize the power consumption of the controller boards 302a and 302b, the controller boards 302a and 302b are based on ultra-low-power electronics. Also, each of the controller boards 302a and 302b operates in dual-oscillator mode (or, equivalently, dual-power consumption mode): a low power mode and a high power mode. In the low power mode, the low frequency oscillator 340a (or 340b) is turned on so that a system clock operates at a low frequency, preferably but not limited to 32 KHz, and the controller 303a (or 303b) waits for an initiation signal. In the high power mode, a high frequency oscillator 342a (or 342b) is turned on so that the system clock operates at a high frequency, such as 8 MHz. In embodiments, the low frequency oscillator 340a (or 340b) is used for accurate schedule service while the system is asleep, and the high frequency oscillator 342a (or 342b) may be used for fast instruction processing of the controller while the system is awake and executing the software.

The controllers 303a and 303b are interrupt-signal driven, i.e., the sequencer 300 is mostly in the SLEEP mode to minimize its power consumption and waits for an interrupt signal to begin its deployment operation. At a step 404, the sequencer 300 may detect the operating environment when it receives an interrupt signal and determine the mode of operation. Then, at a step 406, it determines whether the signal is sent by a ground support experiment (GSE), i.e., the test box 320 or a detector 310. In embodiments, the test box 320 may send 5V diagnosis signal through the cable 318. Thus, when the sequencer 300 detects a 5V diagnosis signal, it is determined that the signal is sent by the test box 320. If the answer to the determination at step 406 is negative, it enters the FLIGHT mode at a step 408.

The input circuit 311 may include an opto-isolator 324 and a detector 310. The input circuit 311 is powered by a power supply 316 in the launch vehicle and generates light, where the voltage of the power supply may range from 5V-60V, even though other suitable voltage range may be used. This voltage range covers digital logic signals, analog signals, pyro pulse signals, ordnance signals, and launch vehicle power signals, which makes the sequencer 300 a versatile system that can be used on many different platforms by varying launch vehicle resources. In embodiments, the typical launch vehicle voltage (28 Volts) may be used for initiation/start signals. The opto-isolator circuitry 324 prevents the sequencer 300 from sending an electrical signal to the launch vehicle by isolating the sequencer 300 from the launch vehicle's circuitry, to thereby provide system safety to the launch vehicle. Also, for the purpose of system safety, incorrect polarity of the power supply 316 may not turn on the input circuit 311 of the opto-isolator 324. When the input circuit 311 is activated by the launch vehicle to emit light, the detector 310 detects the light and subsequently sends an initiation signal to the controllers 303a and 303b. Light detection allows the sequencer and launch vehicle to be electrically isolated, i.e., an opto-isolator. Light detection also minimizes interfaces between the sequencer and the launch vehicle, so the launch vehicle, for example, only needs to send one signal to the sequencer. Upon receipt of the initiation signal at the step 404, the sequencer 300 enters the FLIGHT mode.

It is noted that the sequencer 300 has minimum pulse-width rejection mechanisms to eliminate a noise-initiated deployment. For instance, input circuit 311 may be erroneously turned on by electrical noise. To eliminate the false trigger, the sequencer 300 may reject the interrupt signal if the input circuit 311 is not asserted for a preset duration. The rejection may be done at the hardware level and/or software level, i.e., the detector 310 may have a circuit to reject the false signal or the controllers 303a and 303b may reject the false signal.

In embodiments, upon entering the FLIGHT mode at the step 408, the controllers 303a and 303b may set up a time interval, turn on the low frequency oscillators 340a and 340b so that a timer starts counting the time, and go to sleep. At the end of the time interval, the timer may wake up the controllers 303a and 303b so that the controllers perform the scheduled deployment. Also, the high frequency oscillator 342a and 342b may be turned on when the controllers 303a and 303b start processing software instructions in a fast and responsive manner. Each controller 303a (or 303b) may do error checking to mitigate radiation effects and single event upsets, compare redundantly stored critical files, check boundary conditions and perform checksum on the files 304a and 304b (or 304c and 304d) before it initiates the deployment process. In embodiments, the scheduled deployment may be stored in each of the files 304a-304d, where the files 304a-304d are identical.

To provide system safety and mission assurance, the sequencer 300 has both hardware redundancy and software redundancy. The hardware redundancy is implemented by installing identical components, such as two identical controller boards 302a and 302b. Also, all the connectors have doubled up pins to increase assurance of connection. The software redundancy is implemented by installing identical files, such as two identical files 304a and 304b in the controller board 302a. The controller, say 303a, in each controller board may perform checksum on the two identical files, say 304a and 304b. If there is a mismatch, the controller 303a may stop or halt operation so that the other controller 303b can perform the deployment process. It is noted that more than two identical components and four files may be implemented without deviating from the scope of the present invention.

The FLIGHT mode is performed during the actual launch process. During the FLIGHT mode, the payloads are deployed from the dispensers or deployment mechanisms 106 and 108. More specifically, the controllers 303a and 303b send trigger signals to one or more dispensers or deployment mechanisms 106 and 108 via the output ports 308a-308n when the payloads reach target orbits. The trigger signals may actuate the actuators using the power stored in the power supply 306, where different types of trigger signals are used depending on the types of the actuator. For example, the actuator may include a loaded spring and release the energy stored in the loaded spring to launch the payload. In another example, the actuator may be motorized, explosive, or propulsive. Having completed the FLIGHT mode, the process of the flow chart 400 proceeds to a step 416 so that the sequencer 300 is reset. It is noted that the sequencer 300 needs to be reset at the step 416 to enter or exit FLIGHT mode, disabling all non-critical features and non-flight functions during the FLIGHT mode. This is a critical safety feature to enhance software system safety and mission assurance to thereby ensure mission success.

In embodiments, the communication port 314 of the sequencer 300 may be connected to the ground support equipment (GSE), such as the test box 320, via the cable 318, where the cable 318 may be a 5V diagnostic connector, RS232, RS585, Ethernet, USB, thunderbolt, mil-std-1553, arinc 429, arinc 664, or other suitable type of electrical cable. A user may operate the GUI 322 displayed on the test box 322, or a computer, to communicate to the sequencer 300. Then, the sequencer 300 detects this connection 320 to enter a launch preparation (LAUNCH PREP) mode. In such a case, the answer to the determination at the step 406 is positive, and the process of the flow chart 400 proceeds to a step 410.

In the LAUNCH PREP mode, the user may operate the GUI 322 in either FLIGHT TESTING mode or SEQUENCE LOADING & COMMUNICATIONS mode. At the step 410, the sequencer 300 may determine whether the LAUNCH PREP mode is the SEQUENCE LOADING & COMMUNICATIONS mode. When the user operates the GUI 322 in the SEQUENCE LOADING & COMMUNICATIONS mode, the answer to the determination at the step 410 is positive, and the process proceeds to a step 414. In the SEQUENCE LOADING & COMMUNICATIONS mode, the user may assign each dispenser to one of the channels of the adapter assembly 104. Also, the user may set a deployment sequence for the secondary payloads so that the actuator of each dispenser is operated when the adaptor assembly 104 reaches a target orbit. In embodiments, the deployment sequence may be stored in each of the files 304a-304d. Having completed the SEQUENCE LOADING & COMMUNICATIONS mode, the process of the flow chart 400 may proceed to the step 416.

If the LAUNCH PREP mode is the FLIGHT TESTING mode, the process of the flow chart 400 proceeds to a step 412. In some embodiments, the user may manually operate a toggle switch 330 on the test box 320 to switch between the FLIGHT TESTING mode and the SEQUENCE LOADING & COMMUNICATIONS mode. In other embodiments, the GUI 322 may include a button that allows the user to switch between the FLIGHT TESTING mode and the SEQUENCE LOADING & COMMUNICATIONS mode. In the FLIGHT TESTING mode, the sequencer 300 performs the deployment process on the ground, i.e., the sequencer 300 triggers the actuators without being interrupted by any external signal except the signal generated by the toggle switch 330. In the FLIGHT TESTING Mode, the communication between the test box 320 and the sequencer 300 is disabled. Then, the sequencer 300 initiates its deployments by receiving a launch vehicle simulation signal generated by the test box 320 when the operator pushes the button 312b. In embodiments, NLAS may be mounted on a sequencer test stand so that the actual deployment testing may be performed. For brevity, the sequencer test stand is not shown in FIG. 3. Upon completion of the FLIGHT TESTING Mode, the process of the flow chart 400 may proceed to the step 416.

As discussed above, the user may operate the switch 330 to switch between the SEQUENCE LOADING & COMMUNICATIONS mode and the FLIGHT TESTING mode. For example, the user may complete the SEQUENCE LOADING & COMMUNICATIONS mode and toggle the switch 330 so that the sequencer 300 may enter the FLIGHT TESTING mode. The arrow 420 represents that the user may switch between the two modes. Then, the user may push the Launch Vehicle simulator button 312b on the test box 320 to simulate the interrupt signal from the launch vehicle. Upon receiving a signal from the button 312b, the sequencer 300 may perform the programmed deployment sequence. The user may toggle the switch 330 to exit the FLIGHT TESTING mode and abort the deployment sequence during the FLIGHT TESTING mode.

It is noted that the FLIGHT TESTING mode is similar to the FLIGHT mode since the sequencer 300 performs the programmed deployment sequence in both modes. The difference is that the user may exit the FLIGHT TESTING mode by toggling the switch 330 while the sequencer cannot exit the FLIGHT mode. The sequencer 300 enters the FLIGHT mode during the actual launch process. Thus, during the FLIGHT mode, the sequencer 300 would not stop the programmed deployment sequence through an erroneous event.

As discussed above, each controller, say 302a, may include error detection software and perform Error Detection and Correction (EDAC). EDAC may include, but is not limited to, redundant file comparison checking, triple module redundancy, byzantine voting, boundary condition checking, checksums/CRCs, Reed-Solomon encoding, other error correcting codes. The error detection software performs a comparison check on the two files, say 304a and 304b, stored in the controller board, say 302a. If there is mismatch, the controller, say 303a, would stop or halt operation and the other controller, say 303b, would perform the deployment sequence. The STATUS LEDs 309a (or 309b) may indicate whether the controller 303a (or 303b) finds a mismatch or not. In embodiments, a human operator may push the STATUS button 312a on the sequencer. When the STATUS button 312a is pushed, the error detection software would perform redundant file comparison checking, checksums, and boundary condition checking on the two files stored in the corresponding controller board to thereby check the integrity of the two files. If a mismatch between the two files is found, the corresponding LED 309a (or 309b) will not be turned on. During the actual flight process, the files may be damaged by various external disturbances, such as radiation or heat energy. The controller having damaged file would stop or halt operation so that the other controller would perform the programmed deployment sequence. It is noted that the button 312b may be pushed by the human operator during the ground testing only.

The number of actuators may change depending on the type and number of secondary payloads carried by the adapter assembly 104. For example, if each channel of the adapter assembly 104 carries 3 U nanosat, the sequencer 300 may send eight actuator signals. In embodiments, the pulse width of each actuator signal may be 200 ms and the current may be 2 A or higher. In embodiments, redundant deployment impulses are sent in series to each actuator as a backup feature in the case where an actuator gets stuck.

In embodiments, the adapter assembly 104 may include multiple sequencers connected to each other in a daisy chain. Each sequencer may send a signal, such as an auxiliary signal, to the next sequencer in the daisy chain. As such, the first sequencer in the daisy chain may have the detector 310 to receive an interrupt signal and send an initiation signal, while the other sequencers in the daisy chain may receive the initiation signal via the daisy chain. Also, the daisy chaining sequencers may source power from one sequencer to the next. In some embodiments, the adapter assembly may have one power supply for providing electrical power to the sequencers. In other embodiments, each sequencer may include a power supply. It is noted that the number of sequencers may vary without deviating from the scope of the present invention.

As depicted in FIG. 3, in embodiments, the power supply 306 is the only power supply of the sequencer 300. However, in alternative embodiments, the launch vehicle may provide power to the power supply 306 or directly to the sequencer 300. Also, as discussed above, the power supply 306 may include a rechargeable battery that may be recharged on the ground or during the launch process by the launch vehicle. In embodiments, the shelf lifetime of a non-rechargeable or the primary battery is 2-6 months. The sequencer 300 is based on ultra-low-power electronics and is designed to minimize the power consumption so that a portion of the electrical power stored in the power supply 306 is reserved for operating the actuators. In embodiments, the sequencer 300 may use less than 500 µA, preferably 200-500 µA in its quiescent state, and each controller may consume about 70 µA. In embodiments, each controller may use less than 100 µA during quiescent operation.

The actuators are triggered by the sequencer 300 according to the deployment order stored in the files 304a-304d. In embodiments, the sequencer 300 may deploy the secondary payloads within 1/10 of a second. The sequencer 300 may deploy the secondary payloads in parallel or series or combination thereof. For instance, the sequencer 300 may deploy two secondary payloads at a time. For the purpose of redundancy, the controllers 303a and 303b may send two actuation signals to activate one actuator. For instance, each of the controller 303a and 303b may send an actuation signal to the actuator-a through the output port 308a to ensure that the actuator-a is activated.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 5:
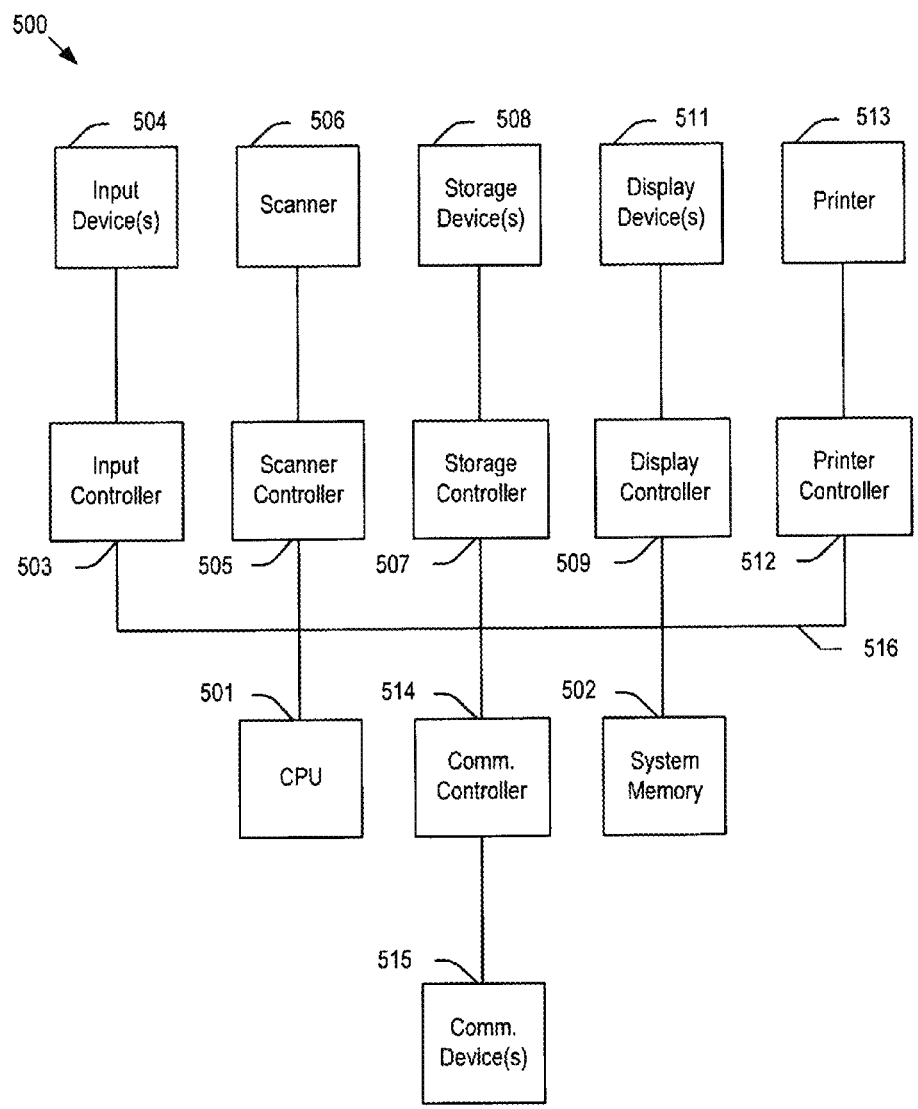
FIG. 5 shows a computer system according to embodiments of the present invention.

Having described the details of the invention, an exemplary system 500, which may be used to implement one or more aspects of the sequencer 300, will now be described with reference to FIG. 5. As illustrated in FIG. 5, the system 500 includes a central processing unit (CPU) 501 that provides computing resources and controls the computer. CPU 501 may be implemented with a microprocessor or the like, and may also include a graphics processor and/or a floating point coprocessor for mathematical computations. The system 500 may also include a system memory 502, which may be in the form of random-access memory (RAM) and read-only memory (ROM).

A number of controllers and peripheral devices may also be provided, as shown in FIG. 5. An input controller 503 represents an interface to various input device(s) 504, such as a keyboard, mouse, or stylus, as well as the buttons 312*a*, 312*b* and 312*c*. There may also be a scanner controller 505, which communicates with a scanner 506. The system 500 may also include a storage controller 507 for interfacing with one or more storage devices 508 each of which includes a storage medium such as magnetic tape or disk, or an optical medium that might be used to record programs of instructions for operating systems, utilities and applications which may include embodiments of programs that implement various aspects of the present invention. The storage device(s) 508 may also be used to store processed data or data, such as files 304*a*-304*d*, to be processed in accordance with the invention. The system 500 may also include a display controller 509 for providing an interface to a display device 511, which may be a cathode ray tube (CRT), a thin film transistor (TFT) display, or other type of display. The display 511 may allow the operator to control the sequencer 300 during the ground testing. The system 500 may also include a printer controller 512 for communicating with a printer 513. A communications controller 514 may interface with one or more communication devices 515, which enables the system 500 to connect to remote devices through any of a variety of networks including the Internet, a local area network (LAN), a wide area network (WAN), or through any suitable electromagnetic carrier signals including infrared signals.

In the illustrated system, all major system components may connect to a bus 516, which may represent more than one physical bus. It is noted that, to provide system safety and mission assurance, the sequencer 300 has both hardware redundancy and software redundancy. The hardware redundancy is implemented by installing identical cables for the bus 516. Also, all the connectors have doubled up pins to increase assurance of connection.

It is noted that various system components in FIG. 5 may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A sequencer for deploying one or more payloads, comprising:
    a plurality of controller boards, each of the controller boards having a controller for controlling deployment of payloads and a plurality of data files;
    a power supply coupled to the plurality of controller boards and adapted to provide an electrical power to the plurality of controller boards;
    a plurality of output ports coupled to the plurality of controller boards and configured to transmit signals from the plurality of controller boards to dispensers containing the payloads therein;
    a detector coupled to the plurality of controller boards and adapted to detect an external signal and, in response to the external signal, to send an initiation signal to the plurality of controller boards; and
    a connection port for connecting a plurality of sequencers together in a daisy chain,
    wherein the detector of the sequencer is adapted to send the initiation signal to the plurality of sequencers, and
    wherein one controller is able to check integrity of a data file of the plurality of data files and the other controller is able to check integrity of an identical data file and wherein at least one controller is able to halt controlling the deployment of the payloads when a mismatch between the data file checked by one controller and the data file checked by the other controller is detected.

2. A sequencer for deploying one or more payloads, comprising:
    a plurality of controller boards, each of the controller boards having a controller for controlling deployment of payloads and a plurality of data files;
    a power supply coupled to the plurality of controller boards and adapted to provide an electrical power to the plurality of controller boards;
    a plurality of output ports coupled to the plurality of controller boards and configured to transmit signals from the plurality of controller boards to dispensers containing the payloads therein;
    a detector coupled to the plurality of controller boards and adapted to detect an external signal and, in response to the external signal, to send an initiation signal to the plurality of controller boards; and
    a connection port for connecting a plurality of sequencers together in a daisy chain,
    wherein the detector of the sequencer is adapted to send the initiation signal to the plurality of sequencers,
    wherein the controller boards include electronics which consume less than 500 µA in their quiescent state, and
    wherein the power supply includes at least one of a battery pack, a bank of capacitors, and a combination thereof and wherein the power supply activates deployment of the payloads and is electrically isolated from the launch vehicle.

3. A sequencer as recited in claim 2, wherein the detector is adapted to detect a light emitted from an opto-isolator powered by a launch vehicle and wherein the opto-isolator is activated by a launch vehicle that carries the sequencer, wherein the detector of the sequencer is electrically isolated from the opto-isolator of the launch vehicle.

4. A sequencer as recited in claim 3, wherein the detector is configured to detect light emitted from the opto-isolator powered in a range of voltages, 5V to 60V depending of the power system of a launch vehicle that carries the sequencer.

5. A sequencer as recited in claim 2, further comprising:
    a first oscillator for providing a first system clock signal at a first frequency, the first oscillator performing schedule services while the sequencer is asleep; and
    a second oscillator for providing a second system clock signal at a second frequency, the second oscillator performing instruction processing while the sequencer is awake,
    wherein the first frequency is lower than the second frequency and the controller uses the first system clock signal until the initiation signal is received to thereby minimize consumption of the electrical power.

6. A sequencer for deploying one or more payloads, comprising:
    a plurality of controller boards, each of the controller boards having a controller for controlling deployment of payloads and a plurality of data files;
    a power supply coupled to the plurality of controller boards and adapted to provide an electrical power to the plurality of controller boards;
    a plurality of output ports coupled to the plurality of controller boards and configured to transmit signals from the plurality of controller boards to dispensers containing the payloads therein;
    a detector coupled to the plurality of controller boards and adapted to detect an external signal and, in response to the external signal, to send an initiation signal to the plurality of controller boards; and
    a connection port for connecting a plurality of sequencers together in a daisy chain,
    wherein the detector of the sequencer is adapted to send the initiation signal to the plurality of sequencers,
    wherein the dispensers are adjustable to accommodate different sizes of payloads, and
    wherein each of the dispensers is coupled to the controllers through one of the plurality of output ports and wherein the controllers are configured to send redundant deployment signals in a series, to actuators of the dispensers.

7. A sequencer as recited in claim 6, where the actuators are triggered using the electrical power of the power supply of the sequencer.

8. A system for launching one or more payloads, comprising:
    an adapter assembly;
    a plurality of sequencers mounted to the adapter assembly and including;
        a plurality of controller boards, each of the controller boards having a controller for controlling deployment of the payloads and a plurality of data files;
        a plurality of output ports coupled to the plurality of controller boards and configured to transmit signals from the plurality of controller boards to dispensers containing the payloads therein, the adapter assembly having a plurality of channels for accommodating the dispensers;

a detector coupled to the plurality of controller boards and adapted to detect an external signal and, in response to the external signal, to send an initiation signal to the plurality of controller boards; and a connection port for connecting the plurality of sequencers together in a daisy chain; and at least one power supply coupled to the at least one sequencer and adapted to provide an electrical power to the plurality of sequencers.

9. A system as recited in claim 8, wherein the system is configured to be carried in a primary fairing of a launch vehicle and wherein the system is electrically isolated from the launch vehicle.

10. A system as recited in claim 8, wherein the controller boards include electronics which consume less than 500 µA in their quiescent state.

11. A system as recited in claim 8, wherein one controller is able to check integrity of a data file of the plurality of data files and another controller is able to check integrity of an identical data file and wherein at least one controller is able to halt controlling the deployment of the payloads when a mismatch between the data file checked by one controller and the data file checked by the other controller is detected.

12. A system as recited in claim 8, wherein the detector is configured to detect light emitted from an opto-isolator powered in a range of 5V to 60V depending of the power system of a launch vehicle that carries the plurality of sequencers.

13. A system as recited in claim 8, further comprising:

a first oscillator of a sequencer of the plurality of sequencers for providing a first system clock signal at a first frequency, the first oscillator performing schedule services while the sequencer is asleep; and a second oscillator the sequencer for providing a second system clock signal at a second frequency, the second oscillator performing instruction processing while the sequencer is awake, wherein the first frequency is lower than the second frequency and the controller uses the first system clock signal until the initiation signal is received to thereby minimize consumption of the electrical power.

14. A system as recited in claim 8, wherein the at least one power supply includes at least one of a battery pack, a bank of capacitors, and a combination thereof and wherein the at least one power supply activates deployment of the payloads and is electrically isolated from the launch vehicle.

15. A system as recited in claim 8, wherein the dispensers are adjustable to accommodate different sizes of payloads.

16. A system as recited in claim 15, wherein each of the dispensers is coupled to the controllers through one of the plurality of output ports and wherein the controllers are configured to send redundant deployment signals in a series, to actuators of the dispensers.

17. A system as recited in claim 16, where the actuators are triggered using the electrical power of the power supply of a sequencer of the plurality of sequencers.

* * * * *